Nov. 22, 1938.  J. J. CONNER  2,137,713
CLEAT FASTENER MEANS
Filed March 15, 1937
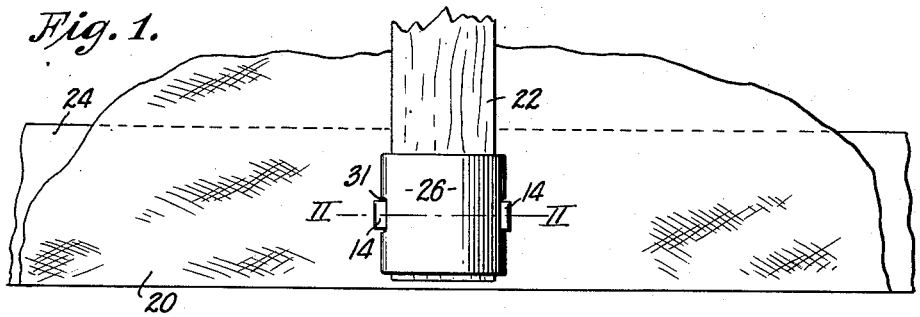
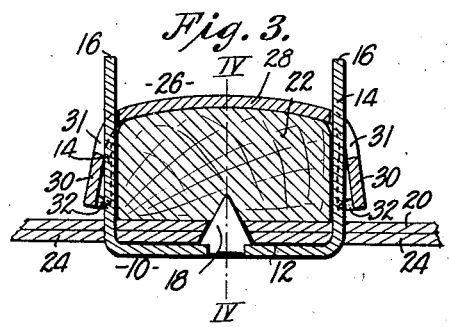
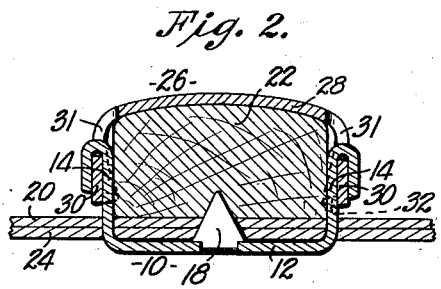
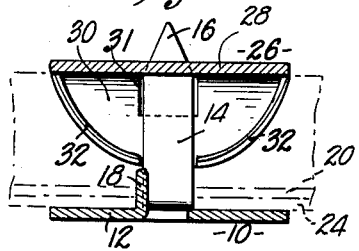
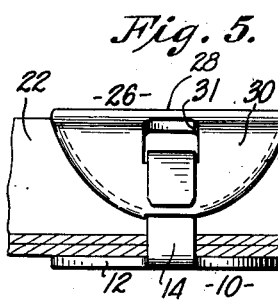
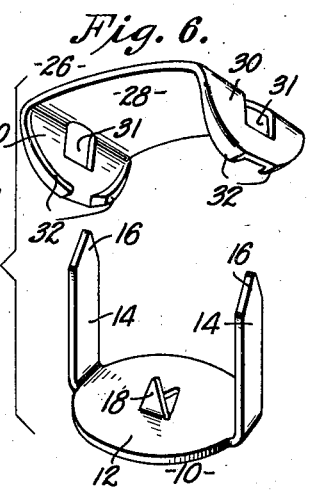
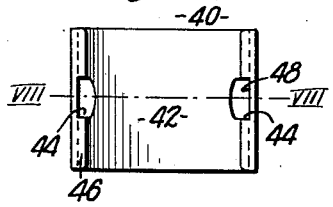
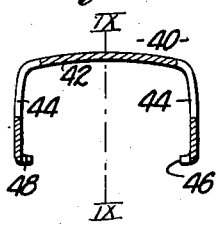
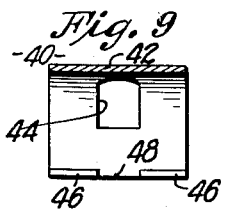
INVENTOR,
Jess J. Conner
BY
Hovey & Hamilton
ATTORNEYS Patented Nov. 22, 1938

2,137,713

UNITED STATES PATENT OFFICE 2,137,713

CLEAT FASTENER MEANS

Jess J. Conner, Burwell, Nebr.

Application March 15, 1937, Serial No. 130,982

5 Claims. (Cl. 198—199)

This invention relates to cleat fastening means and particularly to means whereby carrier slats or cleats are secured to flexible conveyor belts.

The principal object of the present invention is the provision of a specially constructed article of manufacture suitable for securely attaching cleats to a flexible number.

Another object of this invention is the provision of a cleat fastening means which completely surrounds the cleat and secures it to a flexible member.

A further object of the invention is the provision of a separable fastening means adapted to secure a slat to a flexible member and having a tine adapted to pass through said flexible member and into said slat whereby relative movement of the slat and flexible member is precluded.

Other objects of the invention are simplicity and economy of construction, ease of attachment and adjustability for securing together parts of different thicknesses.

Reference will now be had to the drawing, wherein:

Figure 1 is a plan view of a cleat fastening means shown in position for securing a slat to a flexible belting, and embodying this invention.

Fig. 2 is an enlarged section taken on line II—II of Fig. 1.

Fig. 3 is a view similar to that shown in Fig. 2 showing how the parts are positioned before the tongs are clipped and rebent to secure the parts together.

Fig. 4 is a sectional view taken on line IV—IV of Fig. 3, with the slat and belting shown in dotted lines.

Fig. 5 is a side elevation of the cleat fastening means in the operative position.

Fig. 6 is a perspective view of the cleat fastening means in spaced apart relation.

Fig. 7 is an inverted plan view of a modified form of U-shaped staple engaging member.

Fig. 8 is a sectional view taken on line VIII—VIII of Fig. 7.

Fig. 9 is a sectional view taken on line IX—IX of Fig. 8.

Throughout the several views of the drawing, like characters designate similar parts and the numeral 10 designates a staple formed from sheet material and having a body portion 12 which is of a relatively large area, and tangs 14 at opposite sides of the body portion which are disposed at substantially right angles to the body portion. Tangs 14 are formed with pointed end 16 to facilitate easy piercing of the flexible belt or any other material to which cleats might be fastened. A tine 18 is pressed from the body 12 and adapted to extend outwardly therefrom in the direction of the tangs. This tine 18 serves to pass through the belting 20 and into the cleat 22 to prevent relative movement thereof.

For reinforcement of belt 20 it will be noted that the belt material is turned back on itself as at 24 to present two thicknesses for receiving the staple, furthermore in some instances an additional strap may also be secured by the same fastener. A U-shaped plate 26 having a body portion 28 of a suitable shape to conform to the top surface of the slat 22, and angled side walls 30, each having openings 31 through which the tangs of the staple are adapted to be passed as shown in Fig. 3. The sides 30 may diverge slightly outwardly to facilitate the positioning of the tangs which fit snugly against the opposite sides of the slat. It will be observed that the side walls 30 are arcuate and have inturned flanges 32 which are spaced apart to form a notch 34 through which the tang 14 passes to hold the staple and U-shaped plate in proper alignment. When the parts are positioned as shown in Fig. 3 the operator binds the tangs 14 outwardly in opposite directions, clips the points 16, then drives 14 to position shown in Fig. 2. When so positioned the slat and belting will be secured together and the fastening means will surround and closely hug the slat. The flanges 32 will rest against the slat so that a smooth surface will be presented to the materials being handled by the conveyor, furthermore a tight fit between the slat belting and fastening means is obtained.

In the modified form shown in Figs. 7, 8 and 9 the U-shaped plate 40 has a body portion 42, side walls having openings 44 and spaced apart flanges 46 to form a notch 48 for the reception of tangs 14. It is evident that this member 40 may be substituted for U-shaped plate 26.

While this fastening means has been described and shown to be used in fastening transverse slats to conveyor belts such as used in harvesting machines, yet it may be used in many other instances for securing parts together.

What I claim as new and desire to be secured by Letters Patent is:

1. An article of manufacture comprising a staple having a substantially circular body portion with tangs extending outwardly therefrom, and a U-shaped plate having a body portion and spaced apart apertured side walls with inturned flanges at the edges thereof, the tangs of said staple adapted to be inserted through said apertured side walls, and then bent to engage said U-shaped plate and secure together articles positioned between said staple and U-shaped plate, and a tine carried adjacent the center of the body portion of said staple adapted to penetrate and interconnect said secured articles.

2. An article of manufacture comprising a staple having a body portion with tangs extending outwardly therefrom, and a U-shaped plate having a body portion and outwardly diverging, angled side walls with openings formed therethrough, extending therefrom, said side walls each having thin, inturned flanges spaced apart to receive said staple tangs therebetween with said flanges extending inwardly therebeyond, said tangs being adapted to pass through the openings in said side walls and be bent to engage said U-shaped plate to rigidly secure articles between the staple and U-shaped plate.

3. An article of manufacture comprising a staple having a body portion with outwardly extending tangs and a U-shaped plate having a body portion and angled side walls with an opening through that portion adjacent said body portion and with spaced apart, inturned, narrow, arcuate flanges at the edges thereof, said tangs being adapted to fit between the inturned flanges of each side wall respectively and through the adjacent wall opening and be bent to secure said staple and U-shaped plate together, and a tine extending inwardly from the body of said staple between said tangs.

4. Means for fastening a slat to a flexible belt including a staple having tangs adapted to extend through said belt and along the sides of said slat positioned on the belt; a U-shaped plate having apertured side walls adapted to be fitted over said slat with said tangs passing through the respective apertures in said side walls, whereby said tangs may be bent to draw said staple and U-shaped plate together and secure said slat and flexible belt therebetween, and inturned arcuate flanges along the free edge of each of said side walls adapted to extend inwardly a sufficient distance to penetrate the opposite sides respectively of said slat when the fastening means is in the operative position.

5. Means for fastening a slat to a flexible belt including a staple having a circular body portion with transversely projecting tangs adapted to extend through said belt and along the sides of said cleat positioned on the belt; a U-shaped plate having apertured side walls adapted to be fitted over said slat with said tangs passing through the respective apertures in said side walls, whereby said tangs may be bent to draw said staple and U-shaped plate together and secure said slat and flexible belt therebetween, and spaced apart, inturned flanges along the edge of each of said side walls adapted to respectively abut the edges of the respective tangs, said flanges being of greater depth than the thickness of said tangs whereby they penetrate the opposite sides respectively of said slat when the fastening means is in the operative position.

JESS J. CONNER.